United States Patent
Lee et al.

(10) Patent No.: US 11,322,321 B2
(45) Date of Patent: May 3, 2022

(54) MOVABLE PART OF CIRCUIT BREAKER FOR GAS-INSULATED SWITCHGEAR

(71) Applicant: HYOSUNG HEAVY INDUSTRIES CORPORATION, Seoul (KR)

(72) Inventors: Sang Woo Lee, Changwon-si (KR); Su Hyun Park, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 78 days.

(21) Appl. No.: 16/957,325

(22) PCT Filed: Dec. 20, 2018

(86) PCT No.: PCT/KR2018/016398
§ 371 (c)(1),
(2) Date: Jun. 23, 2020

(87) PCT Pub. No.: WO2019/132432
PCT Pub. Date: Jul. 4, 2019

(65) Prior Publication Data
US 2021/0210295 A1  Jul. 8, 2021

(30) Foreign Application Priority Data
Dec. 28, 2017  (KR) .................. 10-2017-0183193

(51) Int. Cl.
*H01H 33/70* (2006.01)
(52) U.S. Cl.
CPC .... *H01H 33/7061* (2013.01); *H01H 33/7038* (2013.01); *H01H 33/7084* (2013.01)

(58) Field of Classification Search
CPC .......... H01H 33/7061; H01H 33/7038; H01H 33/7084; H01H 33/7023; H01H 33/42; H01H 1/385; H02B 13/035
(Continued)

(56) References Cited

U.S. PATENT DOCUMENTS 4,132,876 A * 1/1979 Sato ..................... H01H 33/245
218/62
5,072,084 A * 12/1991 Seki ................... H01H 33/7023
218/59
(Continued)

FOREIGN PATENT DOCUMENTS

DE           2635573 A *  2/1977  ............ H01H 33/91
KR    10-2009-0073784 A    7/2009
(Continued)

*Primary Examiner* — Scott Bauer
*Assistant Examiner* — Sreeya Sreevatsa
(74) *Attorney, Agent, or Firm* — Novick, Kim & Lee, PLLC; Jae Youn Kim

(57) ABSTRACT

A movable part of a circuit breaker for a gas-insulated switchgear is proposed. The movable part includes a puffer cylinder, a nozzle, and a main contact. An outer rib at the rear end of the nozzle is hooked to a hook rib at the front end of the hook part of the puffer cylinder. A chamber guide is provided inside the puffer cylinder so that the nozzle is immobilized. The main contact is mounted on the outer surface of the front end of the hook part. Thus, the number of components constituting the movable part of the circuit breaker is reduced, and the number of bolting points is reduced, thereby greatly reducing man-hours in an assembly work and preventing a main contact separation from occurring due to bolt loosening.

5 Claims, 4 Drawing Sheets

(58) Field of Classification Search
USPC .......................................................... 218/50
See application file for complete search history.

(56) References Cited

U.S. PATENT DOCUMENTS

| | | | | |
|---|---|---|---|---|
| 5,079,392 A | * | 1/1992 | Tsukushi | ................ H01H 33/91 |
| | | | | 218/59 |
| 5,229,561 A | * | 7/1993 | Seki | .................... H01H 33/901 |
| | | | | 218/62 |
| 10,128,071 B2 | * | 11/2018 | Ono | ........................ B32B 15/20 |

FOREIGN PATENT DOCUMENTS

| KR | 10-2010-0043330 A | | 4/2010 |
|---|---|---|---|
| KR | 20100043330 A | * | 4/2010 |
| KR | 20100043330 A | * | 1/2011 |
| KR | 10-2011-0075545 A | | 7/2011 |
| KR | 20140055590 A | * | 5/2014 |
| KR | 20-2016-0004144 U | | 12/2016 |
| KR | 20160004144 U | * | 12/2016 |
| KR | 20160004144 U | * | 12/2016 |

\* cited by examiner

MOVABLE PART OF CIRCUIT BREAKER FOR GAS-INSULATED SWITCHGEAR

TECHNICAL FIELD

The present invention relates to a gas-insulated switchgear and, more particularly, to a movable part of a circuit breaker for a gas-insulated switchgear that moves for an on-off operation in the circuit breaker.

BACKGROUND ART

A gas-insulated switchgear is an electrical facility that improves reliability by storing conductors and various protective devices with insulating gas (SF6), which has excellent insulating and extinguishing performance, in an enclosure which is a sealed metal container. The gas-insulated switchgear includes a circuit breaker, a line disconnector, and a ground switch.

Meanwhile, the circuit breaker of the gas-insulated switchgear generally has a fixed part and a movable part, and connects or disconnects a line while the movable part moves. Such a movable part is generally composed of a puffer cylinder, a nozzle, and a main contact.

For reference, FIG. 1 schematically shows a configuration of a circuit breaker of a general gas-insulated switchgear. According to this, the movable part 1 has a puffer cylinder 3, and a nozzle body 5 is positioned on a front end side of the puffer cylinder 3. The nozzle body 5 is fastened to the puffer cylinder 3 by a bolt 9 together with the main contact 7. Since the puffer cylinder 3 is generally cylindrical, a plurality of bolts 9 is used to form a circular trajectory.

The nozzle 11 is installed by hooking to the nozzle body 5. The nozzle 11 serves to extinguish an arc by injecting the insulating gas supplied from the puffer cylinder. Reference numeral 13 is a nozzle cover, and 14 is a movable arc contact. While being separated from the fixed arc contact 15 after the main contact 7 is separated from a main contact (not shown) of the fixed part, the movable arc contact 14 prevents an arc from occurring at the main contact 7. Then, the insulating gas supplied from the puffer cylinder 3 is injected through the nozzle 11 to extinguish the arc.

However, the movable part of the gas-insulated switchgear according to the related art as described above has the following problems.

In conventional movable part 1, the bolts 9 are used for coupling of the nozzle body 5, the nozzle 11, and the main contact 7. Therefore, there is a problem in that man-hours in an assembly process increases and the total number of components increases.

In addition, the bolt 9 has a problem in that some components of the movable part 1 are not accurately and firmly fixed because of loosening due to vibration or the like generated during use of the movable part 1.

In addition, there is a problem in that the contact surface for electrical connection, which leads to the main contact 7, the nozzle body 5, and the puffer cylinder 3, is relatively narrow. Therefore, there is a problem in that the movable part 1 should be increased in size in order to increase the contact area for energization.

DISCLOSURE

Technical Problem

An objective of the present invention is to solve the conventional problems as described above, and is to maximally reduce the number of components of a movable part of a circuit breaker for a gas-insulated switchgear and miniaturize thereof.

Another objective of the present invention is to form an energized surface between a main contact and a puffer cylinder in a longitudinal direction of the movable part to secure a sufficient energized area while miniaturizing the movable part of the circuit breaker.

Technical Solution

According to the characteristics of the present invention for achieving the above objectives, the present invention includes: a movable part of a circuit breaker for a gas-insulated switchgear, the movable part comprising: a puffer cylinder provided at a front end thereof with a hook part formed around an outer surface thereof with an energized surface extending in a longitudinal direction; a nozzle installed by being hooked to the hook part and injecting insulating gas transferred from a puffer chamber inside the puffer cylinder; and a main contact press-fitted to the hook part of the puffer cylinder and being in contact with a main contact of a fixed part.

A hook rib may be provided at an inner front end of the hook part of the puffer cylinder, so that an outer rib of the nozzle is hooked.

The main contact may be provided around an outer surface of the hook part of the puffer cylinder, the main contact including a contact part having an inner surface thereof in close contact with the energized surface and a stop part formed around a front end of the contact part and being in a position corresponding to the front end of the hook part, and a part to which the contact part and the stop part are connected may be provided with a curved surface or an inclined surface.

An outer diameter of the hook part of the puffer cylinder may have a smallest dimension among all outer diameters of the puffer cylinder.

A chamber guide may be installed inside the puffer cylinder, and a first screw coupling part may be formed in the puffer cylinder and a second screw coupling part may be formed in the chamber guide at a position corresponding to the first screw coupling part of the puffer cylinder, and the first and second screw coupling parts may be coupled to each other.

A front end of the chamber guide may be in close contact with a rear end of the outer rib of the nozzle.

A rear end guide may be formed at a rear end of the nozzle and is positioned on an inner surface of the front end of the chamber guide.

Advantageous Effects

In the movable part of the circuit breaker for the gas-insulated switchgear according to the present invention, the following effects may be obtained.

First, in the present invention, a press-fitted structure of the main contact is used while fastening the puffer cylinder, the nozzle, and the main contact, constituting the movable part. Therefore, when compared to the related art structure using a plurality of bolts, there is an effect in which the number of components is relatively reduced.

In the present invention, since the inner surface of the contact part of the main contact is in close contact with the energized surface formed on the outer surface of a hook part of the puffer cylinder, energization may be performed in a relatively long section in the longitudinal direction of the movable part. In addition, since the energized surface is formed in the longitudinal direction of the movable part, the diameter of the movable part may be relatively reduced, thereby having an effect of miniaturizing the movable part.

MODE FOR INVENTION

Figure 1:
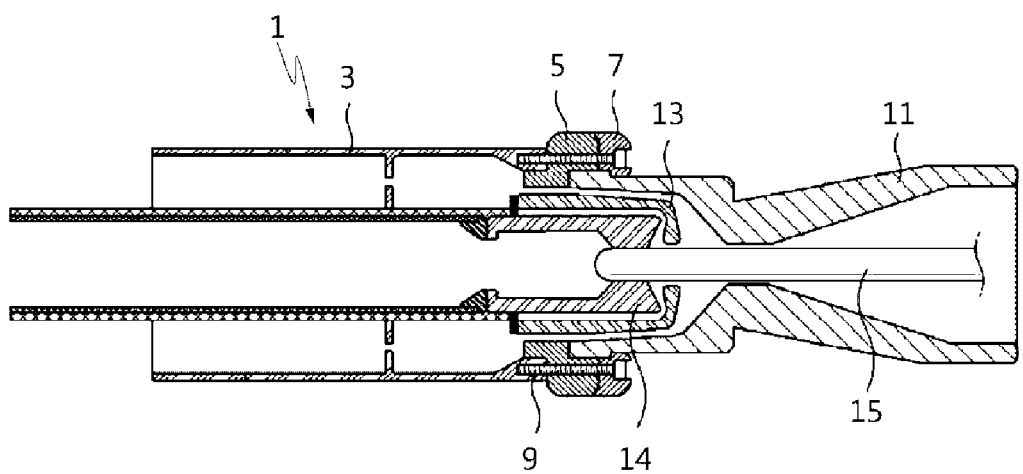
FIG. 1 is a cross-sectional view showing a main part configuration of a circuit breaker for a gas-insulated switchgear according to the related art.
Figure 2:
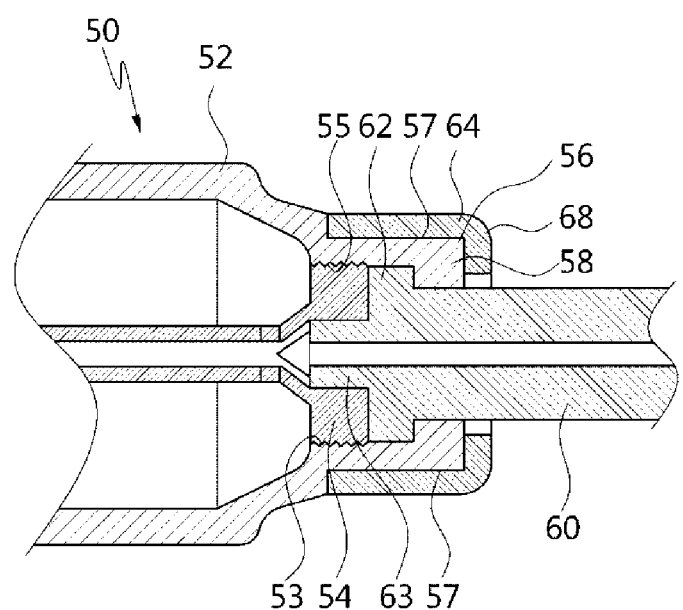
FIG. 2 is a cross-sectional view showing a preferred exemplary embodiment of a movable part of a circuit breaker for a gas-insulated switchgear according to the present invention.
Figure 3:
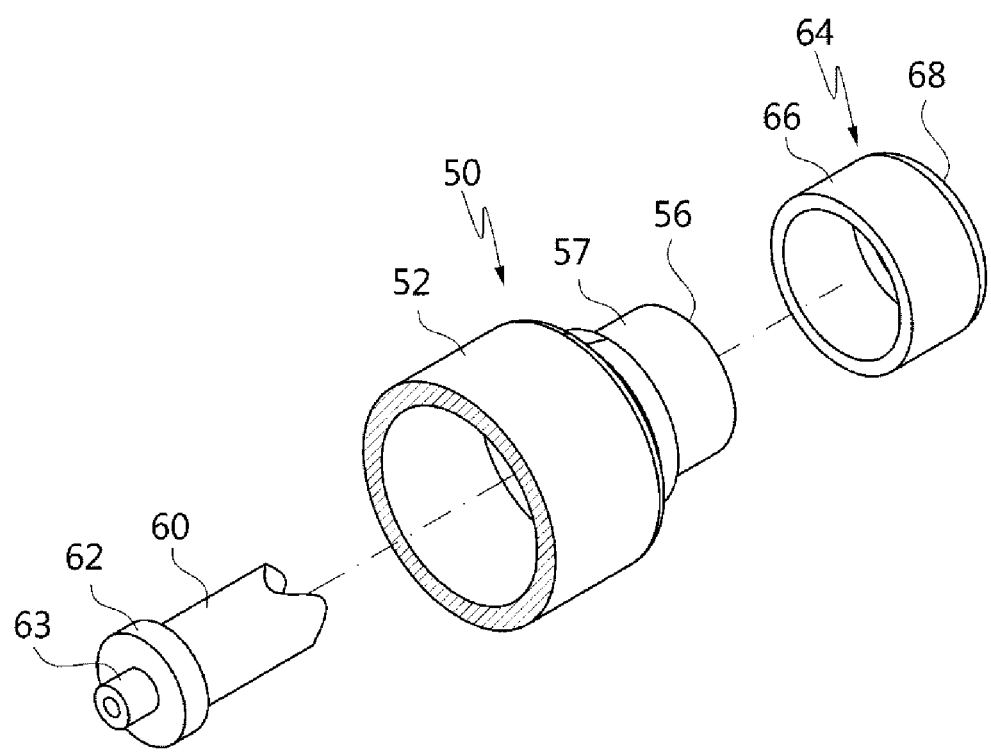
FIG. 3 is an exploded perspective view schematically showing a configuration of the exemplary embodiment of the present invention.
Figure 4:
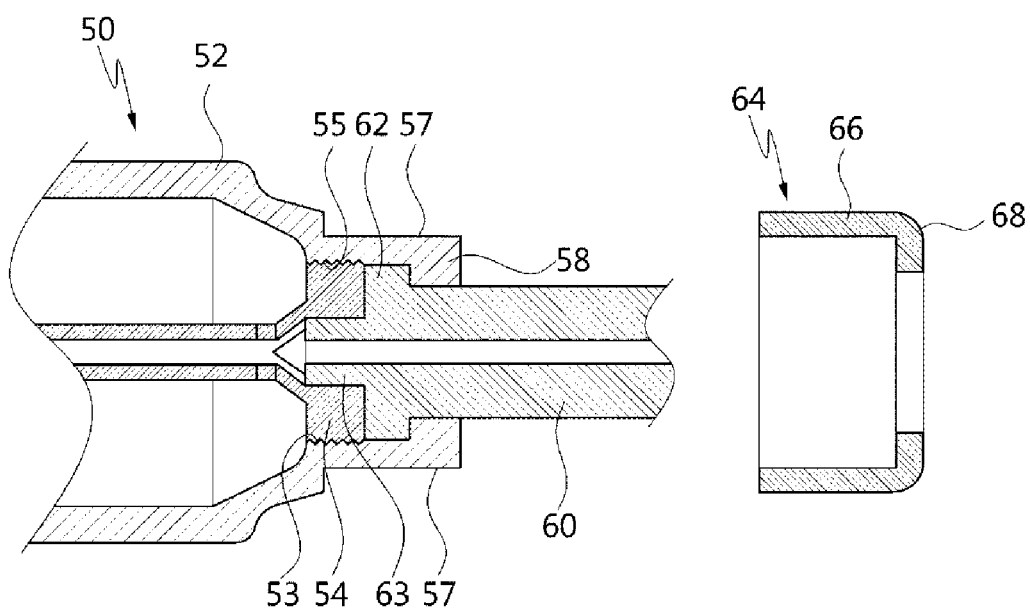
FIG. 4 is a cross-sectional view showing a state before a coupling of the main contact in the exemplary embodiment of the present invention.

Hereinafter, some exemplary embodiments of the present invention are described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the invention makes the subject matter of the invention unclear, the detailed description is omitted.

Further, when describing the components of the present invention, terms such as first, second, A, B, (a) or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component, however it should be understood that yet another component between each of the components may be "connected", "coupled", or "linked" to each other.

As shown in the drawings, the movable part 50 of an exemplary embodiment according to the present invention has a puffer cylinder 52. The puffer cylinder 52 not only forms a framework of the movable part 50, but also constitutes an external appearance to some extent. In addition, the puffer cylinder 52 also serves as energization. The puffer cylinder 52 has a roughly cylindrical shape, and is provided with puffer chambers therein in which insulating gas is positioned. As for the puffer chambers, there may be provided a thermal puffer chamber and a pressure puffer chamber. The insulating gas of the puffer chambers is delivered to the nozzle 60 to be described below, and is injected from the nozzle 60 to extinguish the arc generated between the movable arc contact (not shown) of the movable part 50 and the fixed arc contact of the fixed part (not shown). On the inner surface of the front end of the puffer cylinder 52, more precisely, on the inner surface of the hook part 56 to be described below, there is a first screw coupling part 53 formed with a screw part.

A chamber guide 54 is provided inside the puffer cylinder 52 to form the puffer chambers. On the outer surface of the front end of the chamber guide 54, there is provided a second screw coupling part 55 formed with a screw part. The screw coupling part 55 of the chamber guide 54 is coupled to the screw coupling part 53 of the puffer cylinder 52. A movable arc contact (not shown) is installed inside the chamber guide 54. The movable arc contact is coupled to and separated from the fixed arc contact in the fixed part.

The hook part 56 is provided at the front end of the puffer cylinder 52. The hook part 56 is formed with a smaller outer diameter than that of other parts of the puffer cylinder 52. The outer surface of the hook part 56 is an energized surface 57, which is an area for energization of the main contact 64 to be described below. Since the energized surface 57 is extended in the longitudinal direction of the movable part 50 as a whole, a sufficient area for energization may be secured without increasing the size of the movable part 50 in the width direction.

A hook rib 58 is formed at the front end of the hook part 56. The hook rib 58 is formed around the inner surface of the front end of the hook part 56. In the illustrated exemplary embodiment, the hook rib 58 is formed around the entire front end of the hook part 56, but it is not necessary and may be formed intermittently around the front end thereof.

The nozzle 60 is connected to the front end of the puffer cylinder 52. The nozzle 60 is a part in which the insulating gas transferred from the puffer chamber inside the puffer cylinder 52 is guided and discharged. The insulating gas injected from the nozzle 60 serves to extinguish the arc generated between the movable arc contact (not shown) of the movable part 50 and the fixed arc contact (not shown) of the fixed part.

At the rear end of the nozzle 60, there is provided an outer rib 62. The outer rib 62 is a part that is hooked to the hook rib 58. The outer rib 62 protrudes around the outer surface of the rear end of the nozzle 60. A rear end guide 63 having a cylindrical shape is provided at the rear end of the nozzle 60. The rear end guide 63 is in close contact with the inner surface of the front end of the chamber guide.

The main contact 64 is press-fitted and mounted on the hook part 56 of the puffer cylinder 52. The main contact 64 is made in a roughly cylindrical shape, and the inner diameter thereof is equal to or slightly smaller than the outer diameter of the hook part 56. The main contact 64 is made to cover the entire outer surface of the hook part 56. The main contact 64 is composed of a contact part 66 and a stop part 68, wherein the contact part 66 is a part in close contact with the energized surface 57 of the hook part 56. The stop part 68 is a part formed at the front end of the hook part 56, and is in close contact with the front end of the hook part 56. The outer surface to which the stop part 68 and the hook part 56 are connected is made to be a curved surface, so that contact is performed smoothly when the main contact 64 contacts a main contact (not shown) of the fixed part. The part where the stop part 68 and the hook part 56 are connected to each other may be a curved surface as well as an inclined surface.

Hereinafter, it will be described in detail that the movable part of the circuit breaker for the gas-insulated switchgear according to the present invention having the configuration as described above is assembled and operated.

In the present invention, in assembling the movable part 50 of the circuit breaker, no screws are used. That is, the reason is that a coupling of the nozzle 60 and the puffer cylinder 52 is achieved by a mechanical configuration, and the main contact 64 is press-fitted and installed in the puffer cylinder 52.

In the coupling of the nozzle 60 and the puffer cylinder 52, the nozzle 60 is inserted through the rear end of the puffer cylinder 52, so that the outer rib 62 at the rear end of the nozzle 60 is hooked to the hook rib 58 of the puffer cylinder 52. In a state where the outer rib 62 of the nozzle 60 is hooked to the hook rib 58 of the puffer cylinder 52, the chamber guide 54 is coupled to the puffer cylinder 52.

The chamber guide 54 is inserted through the rear end of the puffer cylinder 52 to couple the screw coupling part 55 of the chamber guide 54 to the screw coupling part 53 of the puffer cylinder 52. To this end, the chamber guide 54 is rotated in the puffer cylinder 52. When the front end of the chamber guide 54 is in close contact with the outer rib 62 of the nozzle 60, the nozzle 60 is immobilized and firmly fixed.

Meanwhile, an installation of the main contact 64 to the hook part 56 of the puffer cylinder 52 is achieved by press-fitting the main contact 64 into the hook part 56. The inner surface of the contact part 66 of the main contact 64 is to be in close contact with the energized surface 57 of the hook part 56, and the stop part 68 of the main contact 64 is to be corresponded to the front end of the hook part 56. Mounting the main contact 64 on the hook part 56 of the puffer cylinder 52 may be performed before installing the nozzle 60 to the hook part 56 of the puffer cylinder 52, or may be performed after installing the nozzle 60 to the hook part 56 of the puffer cylinder 52.

The movable part 50 of the circuit breaker, which is thus assembled, is in a state where the main contact 64 is in contact with the main contact of the fixed part on the line, and then when an abnormal signal occurs, an operation signal is transmitted to the movable part 50, and thus the movable part 50 is moved. For reference, in a state where the main contact 64 of the movable part 50 is in contact with the main contact of the fixed part, the movable arc contact of the movable part 50 is in state of contacting with the fixed arc contact of the fixed part.

When the abnormal signal is given, the movable part 50 is operated. By the operation of the movable part 50, the main contact 64 of the movable part 50 and the main contact of the fixed part are separated, and then the movable arc contact and the fixed arc contact are separated. When the movable arc contact and the fixed arc contact are separated, an arc is generated, and the arc is extinguished with the insulating gas injected through the nozzle 60.

After completing the operation according to the abnormal signal that is given, the movable part 50 moves toward the fixed part again, and the main contact 64 of the movable part 50 and the main contact of the fixed part are connected to each other to connect the line. At this time, the movable arc contact of the movable part 50 and the fixed arc contact of the fixed part come into contact with each other before the main contact 64 of the movable part 50 and the main contact of the fixed part come into contact with each other. By performing in this way, no arc is generated when the main contact 64 of the movable part 50 and the main contact of the fixed part are in contact with each other.

In the description above, although the components of the embodiments of the present disclosure may have been explained as assembled or operatively connected as a unit, the present disclosure is not intended to limit itself to such embodiments. That is, within the scope of the present invention, all of the components may be selectively combined and operated in any numbers. In addition, the terms "comprise", "include", or "have" described above mean that the corresponding component may be inherent unless otherwise stated, and thus it should be construed that it may further include other components, not to exclude other components. That is, terms like "include", "comprise", and "have" should be interpreted in default as inclusive or open rather than exclusive or closed unless expressly defined to the contrary. In the following description, unless otherwise defined, all terms including technical and scientific terms used herein have the same meaning as commonly understood by one of those skilled in the art to which this invention belongs. Commonly used terms, such as predefined terms, should be interpreted as being consistent with the contextual meaning of the related art, and are not to be interpreted as ideal or excessively formal meanings unless explicitly defined in the present invention.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

The invention claimed is:

1. A movable part of a circuit breaker for a gas-insulated switchgear, the movable part comprising:
    a puffer cylinder provided at a front end thereof with a hook part formed around an outer surface thereof with an energized surface extending in a longitudinal direction;
    a nozzle installed by being hooked to the hook part and injecting insulating gas transferred from a puffer chamber inside the puffer cylinder;
    a main contact press-fitted to the hook part of the puffer cylinder and being in contact with a main contact of a fixed part; and
    a chamber guide provided inside the puffer cylinder, a front end of the chamber guide being in contact with a rear end of an outer rib of the nozzle,
    wherein a first screw coupling part is formed in the puffer cylinder and a second screw coupling part is formed in the chamber guide at a position corresponding to the first screw coupling part of the puffer cylinder, and the first and second screw coupling parts are coupled to each other.

2. The movable part of claim 1, wherein a hook rib is provided at an inner front end of the hook part of the puffer cylinder, so that the outer rib of the nozzle is hooked.

3. The movable part of claim 2, wherein the main contact is provided around an outer surface of the hook part of the puffer cylinder, the main contact comprising a contact part having an inner surface thereof in contact with the energized surface and a stop part formed around a front end of the contact part and being in a position corresponding to the front end of the hook part, and a connection part through which the contact part and the stop part are connected to each other is provided with a curved surface or an inclined surface.

4. The movable part of claim 3, wherein an outer diameter of the hook part of the puffer cylinder has a smallest dimension among all outer diameters of the puffer cylinder.

5. The movable part of claim 1, wherein a rear end guide is formed at a rear end of the nozzle and is positioned on an inner surface of the front end of the chamber guide.

* * * * *